(12) United States Patent
Chen

(10) Patent No.: US 8,922,186 B2
(45) Date of Patent: Dec. 30, 2014

(54) METHOD AND APPARATUS FOR ALL DUTY CURRENT SENSING IN CURRENT MODE CONVERTER

(71) Applicant: Anpec Electronics Corporation, Hsin-Chu (TW)

(72) Inventor: Chih-Ning Chen, Taipei (TW)

(73) Assignee: Anpec Electronics Corporation, Hsinchu Science Park, Hsin-Chu (TW)

( * ) Notice: Subject to any disclaimer, the term of this patent is extended or adjusted under 35 U.S.C. 154(b) by 265 days.

(21) Appl. No.: 13/628,025

(22) Filed: Sep. 26, 2012

(65) Prior Publication Data

US 2013/0293211 A1  Nov. 7, 2013

(30) Foreign Application Priority Data

May 7, 2012 (TW) .............................. 101116166 A

(51) Int. Cl.
*G05F 1/10* (2006.01)

(52) U.S. Cl.
USPC .......................................... 323/285; 323/271

(58) Field of Classification Search
CPC .......... G05F 1/461; G05F 1/565; G05F 1/575
USPC ................... 323/222–225, 268, 271, 282–285
See application file for complete search history.

(56) References Cited

U.S. PATENT DOCUMENTS

| | | | |
|---|---|---|---|
| 4,661,766 A | 4/1987 | Hoffman | |
| 4,967,309 A | 10/1990 | Hoffman | |
| 6,853,174 B1* | 2/2005 | Inn | 323/285 |
| 7,176,665 B2 | 2/2007 | Knoedgen et al. | |
| 7,936,160 B1* | 5/2011 | Sheehan | 323/285 |
| 7,990,118 B2* | 8/2011 | Feng et al. | 323/271 |
| 2010/0026262 A1* | 2/2010 | Sase et al. | 323/283 |
| 2011/0241641 A1* | 10/2011 | Chen et al. | 323/284 |
| 2011/0279048 A1 | 11/2011 | Briggs | |

FOREIGN PATENT DOCUMENTS

| | | |
|---|---|---|
| EP | 1 503 490 B1 | 10/2006 |
| TW | M244644 | 9/2004 |
| TW | 200951667 | 12/2009 |
| TW | 201003082 | 1/2010 |
| TW | 201005464 | 2/2010 |
| TW | 201118523 | 6/2011 |

* cited by examiner

*Primary Examiner* — Matthew Nguyen

(74) *Attorney, Agent, or Firm* — Winston Hsu; Scott Margo

(57) ABSTRACT

A current sensing apparatus for a voltage converter apparatus includes a circuit selection module for generating a circuit selection result according to a clock signal and a duty cycle signal; a current sensing module coupled to the circuit selection module, an up-bridge circuit and a down-bridge circuit of the voltage converter apparatus for measuring an up-bridge conduction current and a down-bridge conduction current according to the circuit selection result; and a current generation module coupled to the current sensing module and a slope compensation circuit of the voltage converter apparatus for generating a sensing voltage according to a slope compensation current, the up-bridge conduction current or the down-bridge conduction current, so as to adjust the duty cycle signal of the controller. The current sensing apparatus utilizes the duty cycle signal to drive the voltage converter apparatus.

18 Claims, 14 Drawing Sheets

METHOD AND APPARATUS FOR ALL DUTY CURRENT SENSING IN CURRENT MODE CONVERTER

BACKGROUND OF THE INVENTION

1. Field of the Invention

The present invention relates to a current sensing apparatus and a voltage converter apparatus, and more particularly, to a current sensing apparatus and a voltage converter apparatus which can simultaneously measure conduction currents of an up-bridge circuit and a down-bridge circuit.

2. Description of the Prior Art

Electronic devices usually have different composing elements that operate with different operational voltages. Thus, it is necessary to utilize different DC-DC voltage converters in order to achieve different voltage modulations, such as modulation for raising voltage values or degradation voltage values, and to maintain them at predetermined voltage values. Many types of DC-DC voltage converters have been widely developed and are derived from the buck/step down converter or the boost/step up converter. The buck converter can decrease an input DC voltage to a default voltage level, and the boost converter can increase the input DC voltage to another default voltage level. With development, both the buck and boost converters are varied and modified to conform to different system architectures and requirements.

Please refer to FIG. 1, which illustrates a conventional schematic diagram of a voltage converter 10. As shown in FIG. 1, the voltage converter 10 is utilized to transform an input voltage Vin into an output voltage Vout, and includes a controller 100, a gate driver 101, a driver circuit 102, an output circuit 104, a feedback circuit 106, a current sensing module 108, an error amplifier A_ERR and a pulse width modulation comparator A_PWM. The controller 100 is coupled to the gate driver 101. The gate driver 101 includes an inverter Inv1, buffer amplifiers BA1, BA2, and is coupled to the driver circuit 102 and the current sensing circuit 108. The driver circuit 102 includes switch transistors SW1, SW2, and is coupled to the output circuit 104 and the current sensing circuit 108. The output circuit 104 includes an inductor L1 and a capacitor C1, and is coupled to the feedback circuit 106. The feedback circuit 106 includes resistors R1, R2 and is coupled to the error amplifier A_ERR. The pulse width modulation comparator A_PWM is coupled to the current sensing circuit 108 and the controller 100. The current sensing circuit 108 includes a current comparator A_CS, a current generator Cs, a capacitor C2, an inverter Inv2 and switch elements S1, S2.

In simple, the controller 100 utilizes a pulse width modulation signal or a reset signal Rst to generate a control signal to be transmitted to the gate driver 101. The gate driver 101 utilizes the control signal to correspondingly switch on/off the switch transistors SW1, SW2. Accordingly, the input voltage Vin is transformed into the output voltage Vout via the switch transistors SW1, SW2 and the output circuit 104. The feedback circuit 106 utilizes the resistors R1, R2 to transform the output voltage Vout into a feedback signal to be transmitted to the error amplifier A_ERR. The error amplifier A_ERR compares the feedback signal and a reference voltage Vref to output an error signal. The current sensing circuit 108 utilizes the current comparator A_CS to compare conduction currents passing through two points P1 and P2 of the switch transistor SW2, so as to generate a comparison signal. The current generator Cs utilizes a resistor (not shown in the figure) to transform a difference between the input voltage Vin and the output voltage Vout into a current source to be outputted. Lastly, the control signal is utilized to switch on/off the switch elements S1, S2 such that the comparison signal or the current source is utilized to charge the capacitor C2 to generate a charging voltage value. The pulse width modulation comparator A_PWM compares a difference between the charging voltage value and the error signal to generate the pulse width modulation signal to be transmitted to the controller 100. In other words, the voltage converter apparatus 10 simultaneously utilizes the reset signal Rst and the pulse width modulation signal to correspondingly change a duty cycle for driving the driver circuit 102, so as to adaptively transform the input voltage Vin into the output voltage Vout to satisfy different users' requirements.

However, inductance changes of the inductor L1 may correspondingly change an inductor-current slope between an input stage and an output stage, so as to change values of the output voltage as well as the feedback signal. In the voltage converter apparatus 10, a circuit designer must predetermine values of the input voltage Vin and the output voltage Vout, so as to pre-store the above values inside the current comparator A_CS as the charging voltage value of the capacitor C2. Therefore, users are unable to utilize the current sensing circuit 108 to immediately respond to related conduction information of the voltage converter apparatus 10, which may influence generation of the pulse width modulation signal to reduce efficiency or accuracy for transforming the input voltage Vin into the output voltage Vout.

Besides, conduction periods of the switch transistor SW1 and SW2, i.e. the value of the duty cycle generated by the gate driver 101, may influence the generation of the pulse width modulation signal. For example, a ratio of turning on the switch transistors SW1 and SW2 is 9:1, respectively. Since the conduction period of the switch transistor SW2 is too short or a switch frequency of the switch transistor SW2 is too high for the users to measure the conduction current passing through the switch transistor SW2. The users may have difficulties obtaining the related conduction information of the switch transistor SW2, such as a slope change of the conduction current passing through the switch transistor SW2. Accordingly, the product application of the voltage converter apparatus 10 will be limited.

Therefore, it has become an important issue to provide an adaptive current measurement module for the voltage converter apparatus to improve efficiency/accuracy of transforming the input voltage into the output voltage.

SUMMARY OF THE INVENTION

It is therefore an objective of the invention to provide a current sensing apparatus and a voltage converter apparatus which can simultaneously measure conduction currents of an up-bridge circuit and a down-bridge circuit.

The present invention discloses a current sensing apparatus for a voltage converter apparatus comprising a circuit selection module coupled to a clock generator of the voltage converter apparatus and a controller for generating a circuit selection result according to a clock signal generated by the clock generator and a duty cycle signal generated by the controller, a current sensing module coupled to the circuit selection module, an up-bridge circuit and a down-bridge circuit for measuring an up-bridge conduction current of the up-bridge circuit or a down-bridge conduction current of the down-bridge circuit according to the circuit selection result, and a current generation module coupled to the current sensing module and a slope compensation circuit of the voltage converter apparatus for generating a sensing voltage according to a slope compensation current generated by the slope compensation circuit and the up-bridge conduction current or the down-bridge conduction current, so as to adjust the duty cycle signal of the controller, wherein the current sensing apparatus utilizes the duty cycle signal to drive the voltage converter apparatus.

The present invention also discloses another voltage converter apparatus comprising an input terminal for receiving an input voltage, an output terminal for outputting an output voltage, a clock generator for generating a clock signal, a controller coupled to the clock generator for receiving the clock signal to generate an duty cycle signal, an inverter coupled to the controller for receiving the duty cycle signal to generate a reverse phase duty cycle signal, a gate driver coupled to the inverter for receiving the reverse phase duty cycle signal to generate a gate control signal, a driver circuit comprising an up-bridge circuit and a down-bridge circuit for receiving the gate control signal to control conduction conditions of the up-bridge circuit and the down-bridge circuit, an inductor comprising one end coupled to the driver circuit and another end coupled to the output terminal, a feedback module coupled to the output terminal for generating a feedback signal according to the output voltage, an error amplifier coupled to the feedback module for generating an amplification signal according to the feedback signal and a reference voltage, a loop compensation network coupled to the error amplifier for generating a compensation result according to the amplification signal, a slope compensation circuit for generating a slope compensation current, a current sensing module comprising a circuit selection module coupled to the clock generator and the controller for generating a circuit selection result according to the clock signal and the duty cycle signal, a current sensing module coupled to the circuit selection module, the up-bridge circuit and the down-bridge circuit for measuring an up-bridge conduction current of the up-bridge circuit or a down-bridge conduction current of the down-bridge circuit according to the circuit selection result, and a current generation module coupled to the current sensing module and the slope compensation circuit for generating a sensing voltage according to the slope compensation current and the up-bridge conduction current or the down-bridge conduction current, and a pulse width modulation comparator coupled to the current generation module and the loop compensation network for generating a pulse width modulation signal to the controller according to the sensing voltage and the compensation result.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
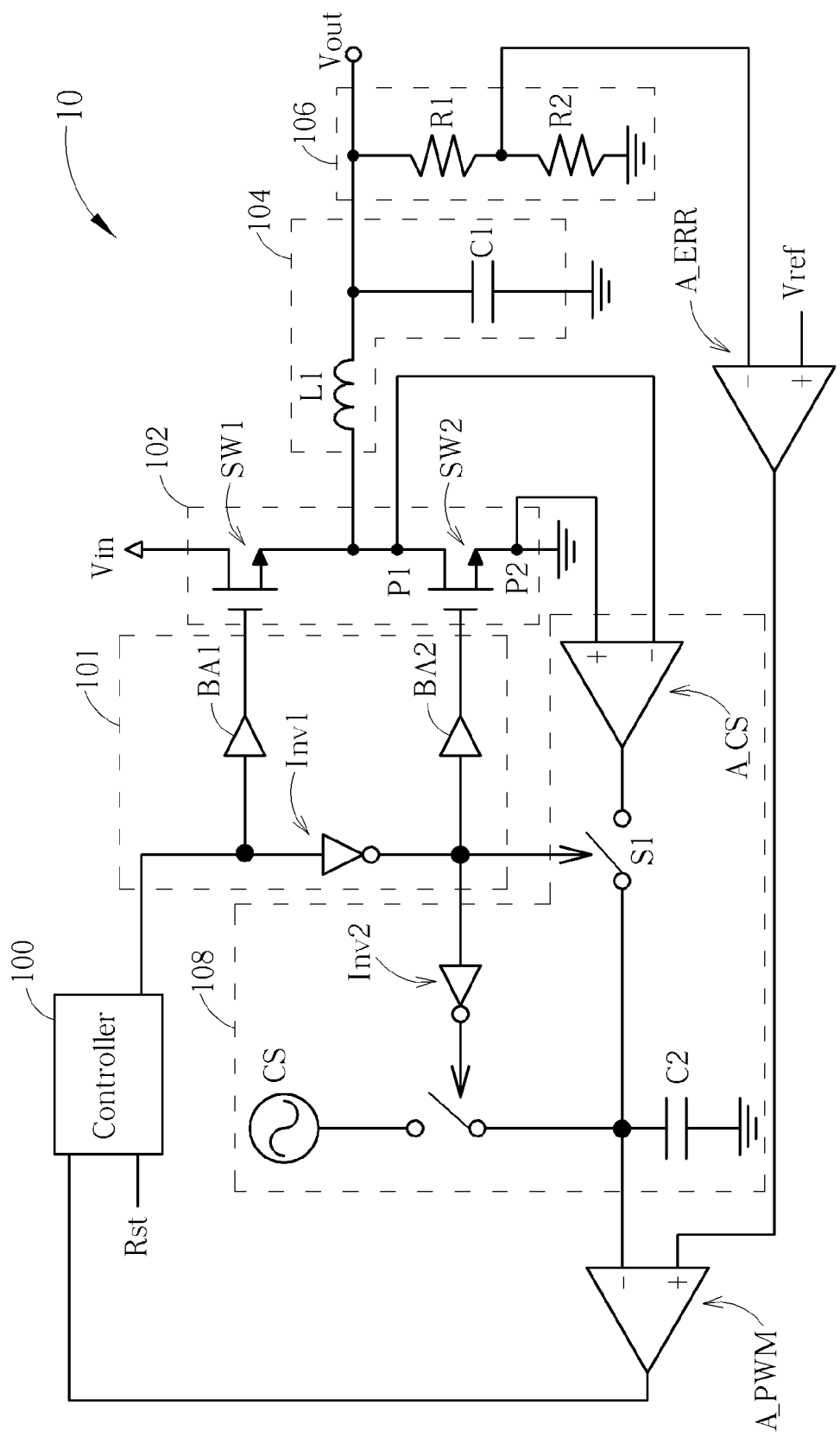
FIG. 1 illustrates a conventional schematic diagram of a voltage converter.
Figure 2:
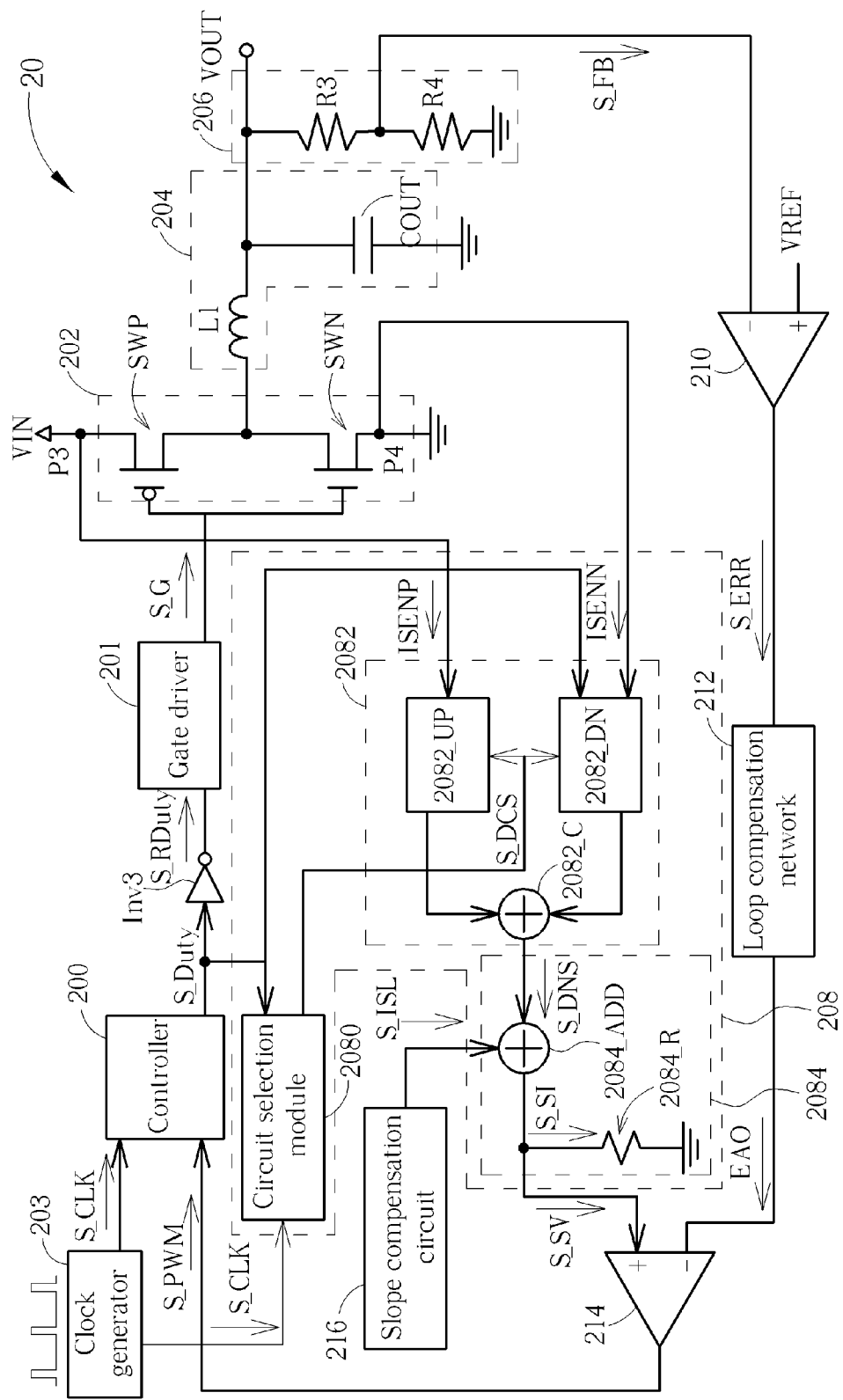
FIG. 2 illustrates a schematic diagram of a voltage converter according to an embodiment of the invention.

Please refer to FIG. 2, which illustrates a schematic diagram of a voltage converter apparatus 20 according to an embodiment of the invention. As shown in FIG. 2, the voltage converter apparatus 20 includes a controller 200, a gate driver 201, a driver circuit 202, a clock generator 203, an output circuit 204, a feedback circuit 206, a current sensing circuit 208, an error amplifier 210, a loop compensation network 212, a pulse width modulation comparator 214 and a slope compensation circuit 216. To compare FIG. 1 with FIG. 2, the voltage converter apparatus 20 is similar to the voltage converter apparatus 10, and further includes the current sensing module 208 including a circuit selection module 2080, a current sensing module 2082 and a current generation module 2084 to simultaneously measure conduction currents of an up-bridge circuit and a down-bridge circuit.

From the element connection, the controller 200 is coupled to the gate driver 201 via an inverter Inv3. Also, the controller 200 is coupled to the clock generator 203, the current sensing circuit 208 and the pulse width modulation comparator 214. The driver circuit 202 includes switch transistors SWP, SWN to be realized via a P-type MOS transistor and an N-type MOS transistor. The switch transistor SWP is regarded as an up-bridge circuit and the switch transistor SWN is regarded as a down-bridge circuit, and the gate driver 201 is coupled to gates of the switch transistors SWP, SWN. Besides, one end of the switch transistor SWP receives an input voltage VIN, and one end of the switch transistor SWN is grounded. The other ends of the switch transistors SWP, SWN are both coupled to the output circuit 204. The output circuit 204 includes an inductor L1 and a capacitor COUT. One end of the inductor L1 is coupled to the switch transistors SWP, SWN, and another end of the inductor L1 is coupled to one end of the capacitor COUT, a feedback circuit 206 and an output terminal to output an output voltage VOUT. The feedback circuit 206 includes resistors R3, R4, wherein one end of the resistor R3 is coupled to one end of the resistor R4 and the error amplifier 210, and another end of the resistor R4 is grounded. The error amplifier 210 receives a reference voltage VREF and is coupled to one end of the loop compensation network 212, and another end of the loop compensation network 212 is coupled to the pulse width modulation comparator 214. The circuit selection module 2080 is coupled to the clock generator 203 and the current sensing module 2082. The current sensing module 2082 includes an up-bridge measurement module 2082_UP and a down-bridge measurement module 2082_DN to be coupled to a terminal point P3 of the switch transistor SWP and a terminal point P4 of the switch transistor SWN, respectively. The current generation module 2084 is coupled to the current sensing module 2082, the slope compensation circuit 216 and the pulse width modulation comparator 214.

In detail, the controller 200 receives a pulse width modulation signal S_PWM and a clock signal S_CLK to correspondingly output a duty cycle signal S_Duty. The inverter Inv3 inverts the duty cycle signal S_Duty to S_RDuty, and the gate driver 201 receives an reverse duty cycle signal S_RDuty to correspondingly generate a gate control signal S_G. The switch transistors SWP, SWN are turned on/off via the gate control signal S_G, and the capacitor COUT and the inductor L1 generate the frequency response to transform the input voltage VIN into the output voltage VOUT. The feedback circuit 206 utilizes a resistance ratio of the resistor R3 and R4 to transform the output voltage VOUT into a feedback signal S_FB to be transmitted to the error amplifier 210. The error amplifier 210 compares the feedback signal S_FB and the reference voltage VREF to correspondingly output an error signal S_ERR. The error signal S_ERR passing through the loop compensation network 212 is transformed into a compensation result EAO to the pulse width modulation comparator 214.

Figure 3:
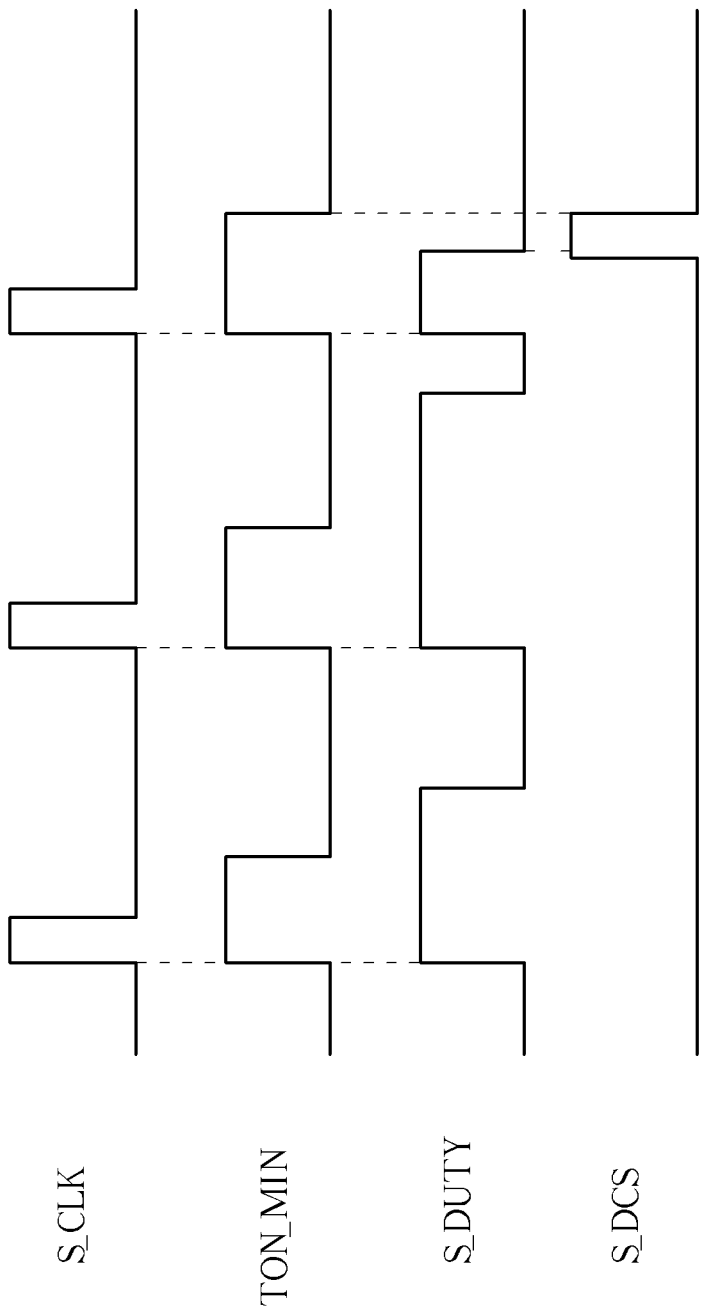
FIG. 3 illustrates a schematic diagram of the circuit selection module generating the circuit selection result according to an embodiment of the invention.

The circuit selection module 2080 compares the clock signal S_CLK and the duty cycle signal S_Duty to generate a circuit selection result S_DCS. Please refer to FIG. 3, which illustrates a schematic diagram of the circuit selection module 2080 generating the circuit selection result S_DSC according to an embodiment of the invention. As shown in FIG. 3, the clock signal S_CLK is transformed into a clock comparison signal TON_MIN via the circuit selection module 2080 and an up-edge driving process. The clock signal S_CLK and the clock comparison signal TON_MIN share the same periodic period, and each pulse of the clock signal S_CLK and the clock comparison signal TON_MIN have different pulse width. The duty cycle signal S_Duty is controlled by the controller 200 to adaptively change pulse duration. Through a comparator (not shown in the figure), if the single pulse duration of the duty cycle signal S_Duty is shorter than the single pulse duration of the clock comparison signal TON_MIN, the circuit selection result S_DCS is generated.

Please refer to FIG. 2 again. The up-bridge sensing module 2082_UP and the down-bridge sensing module 2082_DN receive the circuit selection result S_DCS to determine how long up-bridge sensing module 2082_UP or the down-bridge sensing module 2082_DN measures the driver circuit 202. For example, when the circuit selection result S_DCS equals 0 at a first period corresponding to the conduction period of the switch transistor SWP in the duty cycle signal S_Duty, the up-bridge sensing module 2082_UP measures a up-bridge conduction current ISENP at the terminal point P3 of the switch transistor SWP. When the circuit selection result S_DCS equals 1 at a second period corresponding to the conduction period of the switch transistor SWN in the duty cycle signal S_Duty, the down-bridge sensing module 2082_DN measures a down-bridge conduction current ISENN at the terminal point P4 of the switch transistor SWN. Accordingly, an output element 2082_O receives the up-bridge conduction current ISENP and the down-bridge conduction current ISENN to obtain the sensing current $\Delta I\_SEN$ and a valley current value I_DN. The down-bridge sensing module 2082_DN also receives the duty cycle signal S_Duty for determination of the following calculation. Noticeably, the embodiment of the invention mainly focuses on the conduction period of the switch transistor SWP (i.e. the first period) smaller than the conduction period of the switch transistor SWN (i.e. the second period), and the user is unable to completely measure the current changes before/after conduction of the switch transistor SWP. Certainly, the user can adaptively modify/change the above embodiment according to different users' requirements, which is not limiting the scope of the invention.

Figure 4:
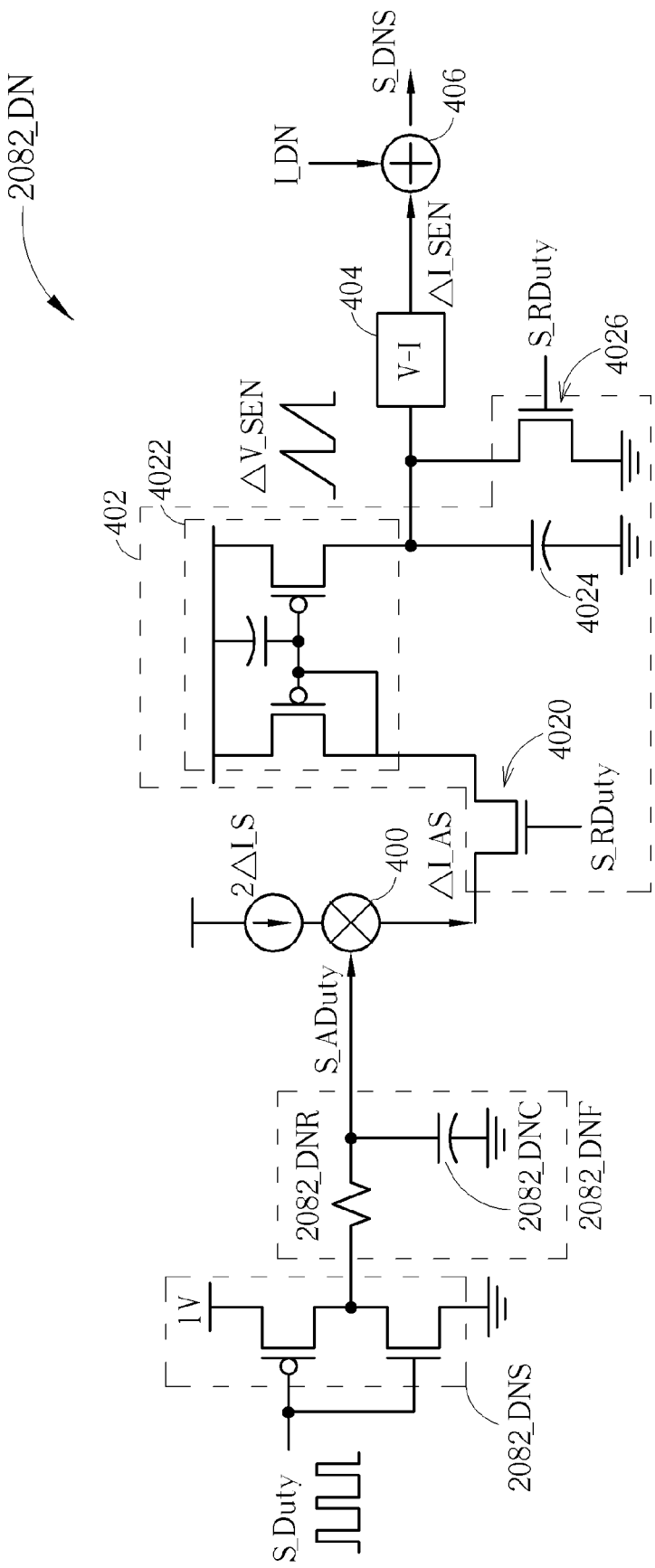
FIG. 4 illustrates a detailed schematic diagram of the current sensing module coupled to the current generation module according to an embodiment of the invention.
Figure 5:
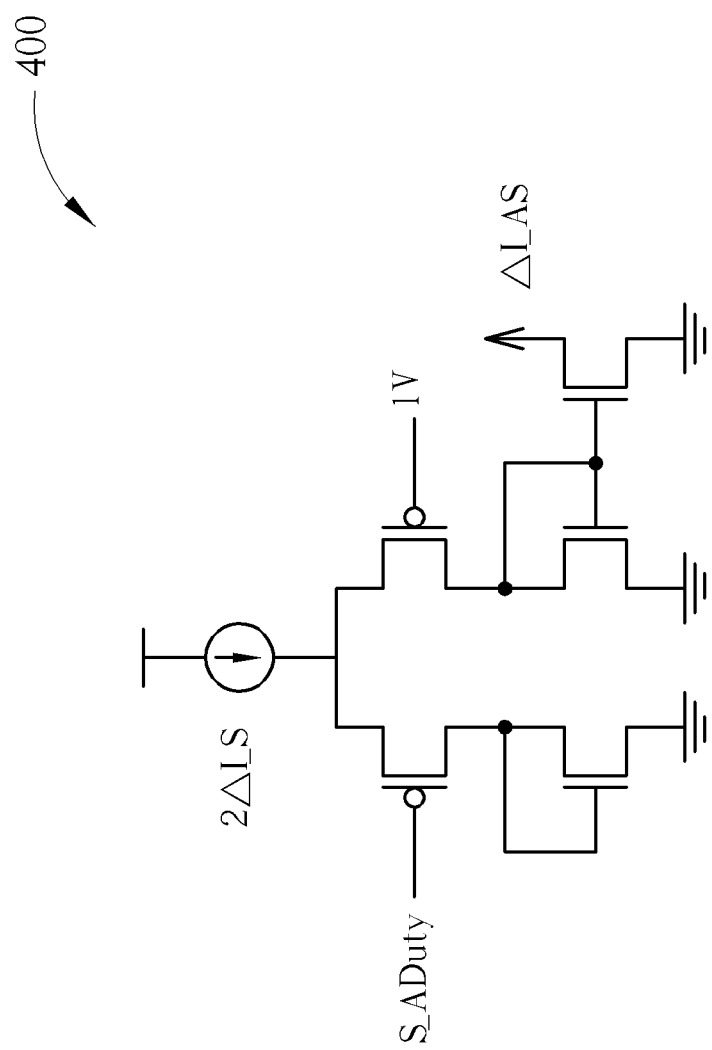
FIG. 5 illustrates a detailed schematic diagram of a multiplier shown in FIG. 4 according to an embodiment of the invention.

Please refer to FIG. 4, which illustrates a detailed schematic diagram of the current sensing module 2082 coupled to the current generation module 2084 according to an embodiment of the invention. In the down-bridge sensing module 2082_DN, a switch module 2082_DNS receives the duty cycle signal S_Duty, wherein the switch module 2082_DNS includes two transistors forming a conduction switch and is coupled to a filter 2082_DNF including a resistor 2082_DNR and a capacitor 2082_DNC. The duty cycle signal S_Duty is transformed into a current clock signal via the switch module 2082_DNS, and the filter 2082_DNF is utilized to transform the current clock signal into an analogy duty cycle signal S_ADuty. Please refer to FIG. 5, which illustrates a detailed schematic diagram of a multiplier 400 shown in FIG. 4 according to an embodiment of the invention. The multiplier 400 receives the analogy duty cycle signal SADuty and twice current difference $\Delta I\_S$. Through a plurality of cascoded transistors and a current mirror effect, an adjusted current difference $\Delta I\_AS$ is correspondingly outputted. Please refer to FIG. 4 again. A transformation module 402 is coupled to the multiplier 400 to receive the adjusted current difference $\Delta I\_AS$. In the meanwhile, the switch elements 4020, 4026 of the transformation module 402 receive the reverse duty cycle signal S_RDuty, and a transformation unit 4022 and a sensing capacitor 4024 is utilized to transform the adjusted current difference $\Delta I\_AS$ into an adjustment voltage difference $\Delta V\_SEN$. The adjustment voltage difference $\Delta V\_SEN$ is utilized to process a charging operation for the sensing capacitor 4024, and the switch element 4026 is utilized to control a charging period of the sensing capacitor 4024. A voltage-current converter 404 is utilized to receive the adjustment voltage difference $\Delta V\_SEN$ to output a sensing current difference $\Delta I\_SEN$. Lastly, an output module 406 is utilized to receive the $\Delta I\_SEN$ and the valley current I_DN to correspondingly output a sensing result S_DNS.

Please refer to FIG. 2 again. An adder 2084_ADD of the current generation module 2084 receives the sensing result S_DNS and a slope compensation current S_ISL to generate a sensing current S_SI. A transformation resistor 2084_R is utilized to transform the sensing current S_SI into a sensing voltage S_SV to be outputted to the pulse width modulation comparator 214. Accordingly, the pulse width modulation comparator 214 compares the compensation result EAO and the sensing voltage S_SV to generate a pulse width modulation signal S_PWM to the controller 200, so as to control the controller 200 to generate different duty cycle signals S_Duty. The voltage converter apparatus 20 adaptively transforms the input voltage VIN into the output voltage VOUT according to different duty cycle signals S_Duty to satisfy different users' requirements.

Figure 6:
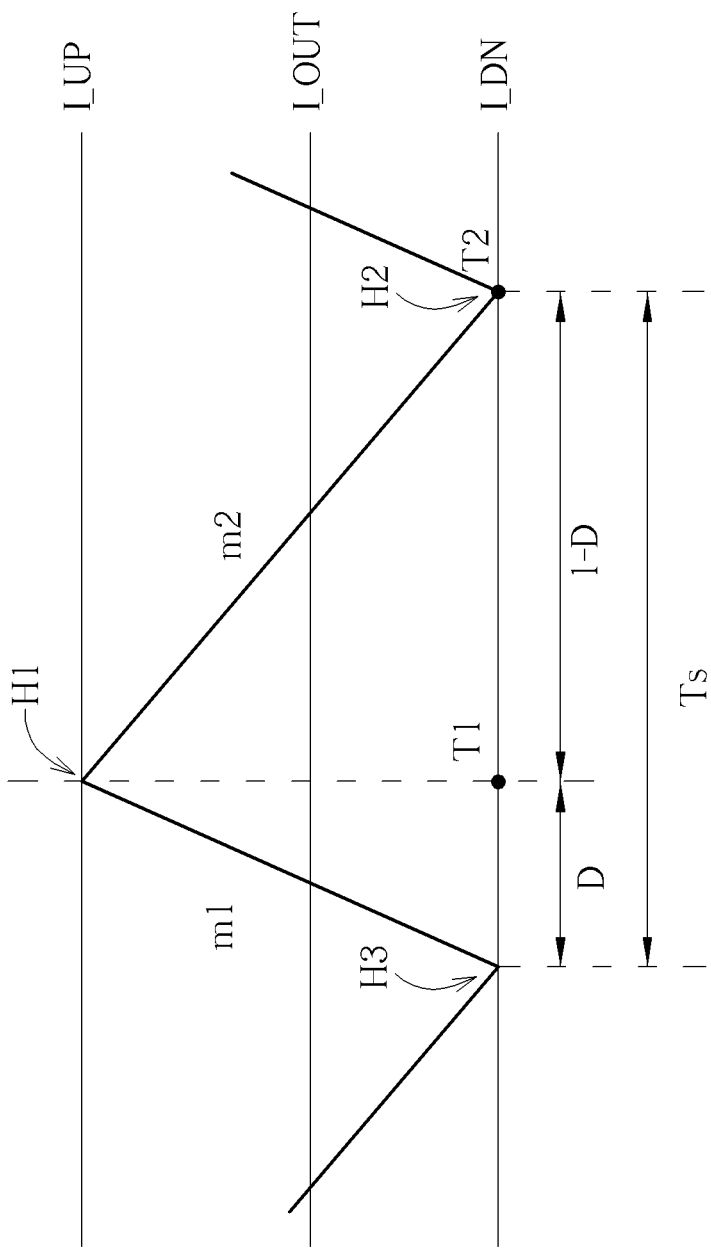
FIG. 6 illustrates a schematic diagram of a measurement result of the circuit sensing module according to an embodiment of the invention.

Please refer to FIG. 6, which illustrates a schematic diagram of a measurement result of the circuit sensing module 2082 according to an embodiment of the invention, wherein the X-axis represents the timing and the Y-axis represents the current values, the symbol Ts represents a total periodic period, the symbol D represents the conduction period of the switch transistor SWP and the symbol 1-D represents the conduction period of the switch transistor SWN. As shown in FIG. 6, when the circuit selection result S_DCS=1 and the circuit sensing module 2082 initially conducts, the circuit sensing module 2082 does not measure information of a point H3. After the conduction period D, the down-bridge sensing module 2082_DN measures the down-bridge conduction current ISENN at the timing T1 to obtain information of a point H1. After the conduction period 1-D, the down-bridge conduction current ISENN is measured at the timing T2 to obtain information of a point H2. Accordingly, the current difference ΔI_S is obtained. The conduction period 1-D and the current difference ΔI_S can be both utilized to derive a slope m2 (i.e. the segment from the point H1 to the point H2), and the information from the point H2 (i.e. the value of the down-bridge conduction valley current I_DN) to the point H3 can be copied to derive a slope m1 (i.e. the segment from the point H3 to the point H1), so as to reconstruct the segment/figure from the point H3 via the point H1 and to the point H2. In simple, the down-bridge sensing module 2082_DN copies the current passing through the switch transistor SWN to be the current passing through the switch transistor SWP, so as to derive the conduction current passing through the switch transistor SWP. When the conduction period D utilized to operate the switch transistor SWP is too small, i.e. the switch transistor SWP is turned off after a short period of turning on and the switch transistor SWN is turned on, accordingly, the circuit sensing module 208 can automatically select to measure the conduction currents of the switch transistor SWP or the switch transistor SWN, so as to obtain an average value I_OUT of the conduction currents.

Figure 7A:
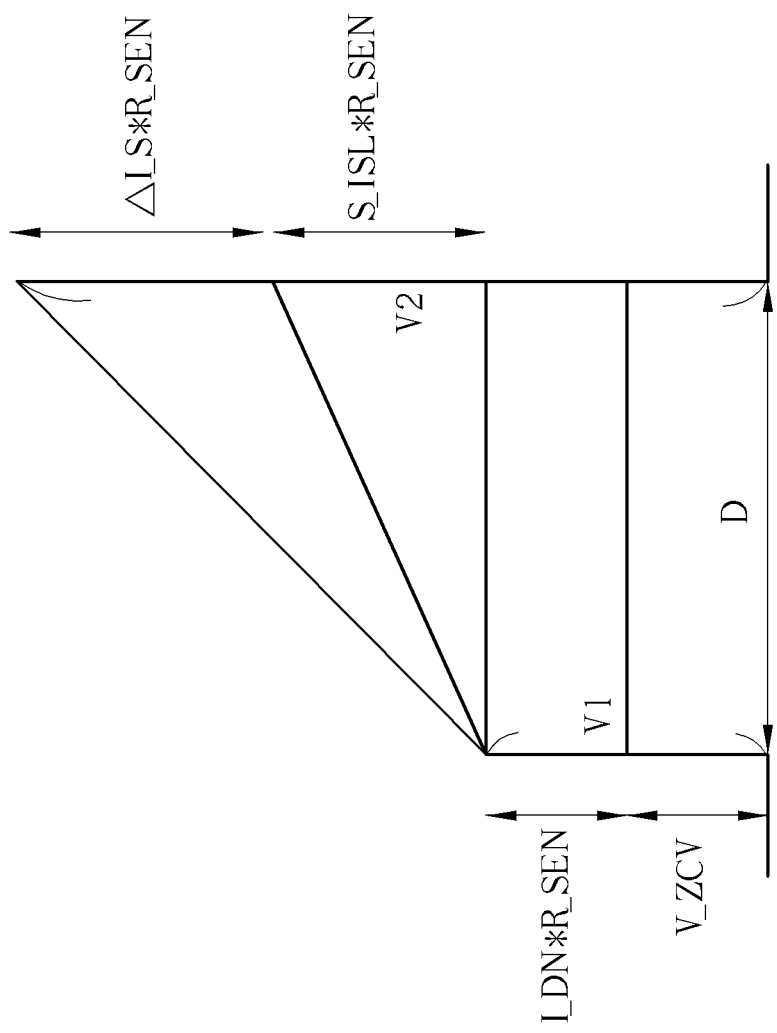
FIG. 7A illustrates a schematic diagram of an output result of the current generation module according to an embodiment of the invention.

Please refer to FIG. 7A, which illustrates a schematic diagram of an output result of the current generation module 2084 according to an embodiment of the invention, wherein the current generation module 2084 is predetermined a sensing resistor R_SEN, such as the transformation resistor 2084_R, to pre-measure a zero-current conduction voltage V_ZCV. As shown in FIG. 7A, the valley current I_DN is multiplied by the sensing resistor R_SEN, and the multiplication is added with the zero-current conduction voltage V_ZCV to obtain a first voltage value V1. After the conduction period D, the current difference ΔI_S is added with the slope compensation current S_ISL, and the sum is multiplied by the sensing resistor R_SEN to be added with the first voltage value V1, so as to obtain a second voltage value V2. Hereinafter, the second voltage value V2 is the sensing voltage S_SV to be transmitted to the pulse width modulation comparator 214 for following operations, which have been explained in the above paragraphs without redundancy description hereinafter.

Figure 7B:
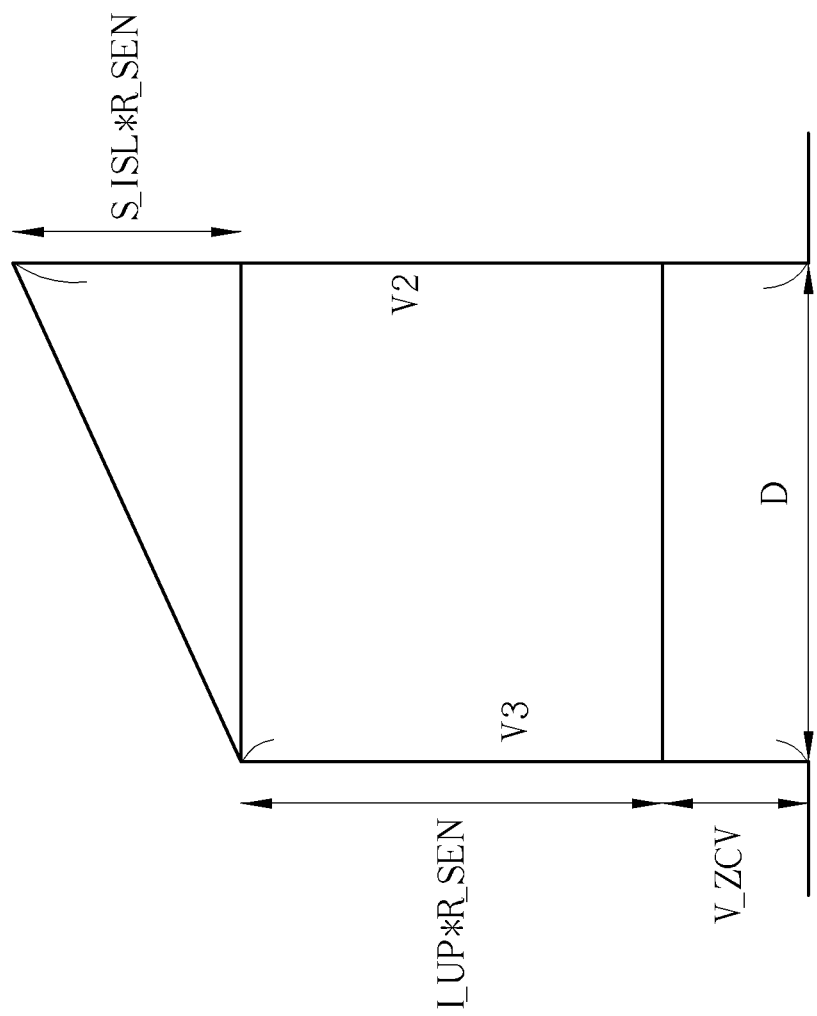
FIG. 7B illustrates a schematic diagram of another output result of the current generation module according to an embodiment of the invention.

Please refer to FIG. 7B, which illustrates a schematic diagram of another output result of the current generation module 2084 according to an embodiment of the invention. In comparison with FIG. 7A which utilizes the current difference ΔI_S for related calculation, the operation shown in FIG. 7B can be processed if the down-bridge sensing module 2082_DN can accurately measure a peak current I_UP. As shown in FIG. 7B, the peak current I_UP is multiplied by the sensing resistor R_SEN to be added with the pre-measured zero-current conduction voltage V_ZCV, so as to obtain a third voltage value V3. Next, the slope compensation current S_ISL is multiplied by the sensing resistor R_SEN to be added with the third voltage value V3, so as to obtain the second voltage value V2 equivalent to the sensing voltage S_SV and to be provided for the pulse width modulation comparator 214 for following operations.

Figure 8A:
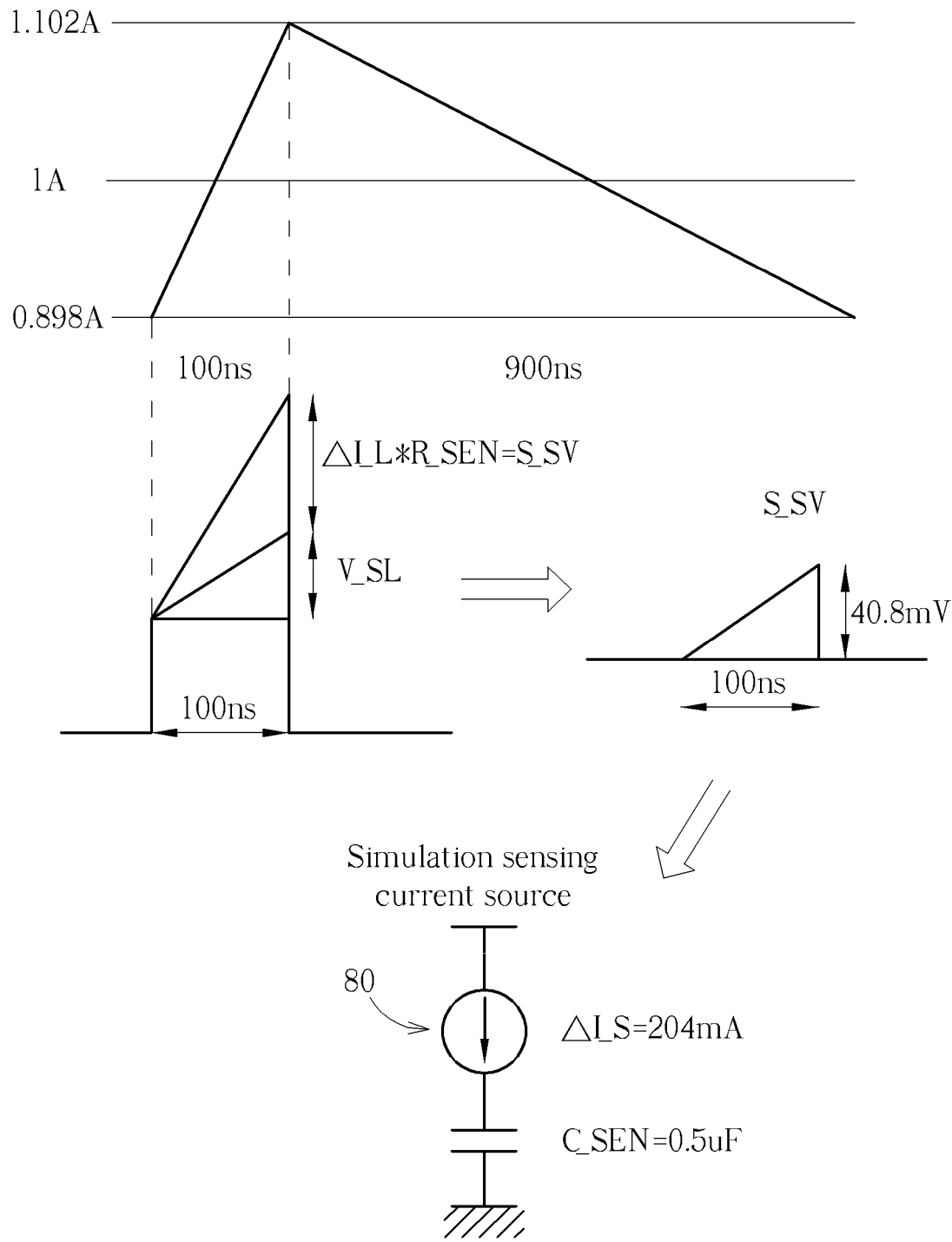
FIG. 8A illustrates a schematic diagram of a practical measurement of the current sensing module according to an embodiment of the invention.

Here are some examples for understanding of the current sensing module 208 applied to the voltage converter apparatus 20. Please refer to FIG. 8A, which illustrates a schematic diagram of a practical measurement of the current sensing module 208 according to an embodiment of the invention, wherein the voltage converter apparatus 20 is operated with the duty cycle signal 1 MHz, the periodic period of 1 us and conduction periods of the switch transistor SWP and the switch transistor SWN are 100 ns and 900 ns, respectively (i.e. 10% the duty cycle signal D), the inductor of the output terminal is 2.2 uH, the sensing resistor is 0.2Ω, the average value of the conduction current is 1 A, the input voltage is 5V, the output voltage is 0.5V, and the symbol V_SL is demonstrated as the corresponding voltage value of the slope compensation circuit 216. As shown in FIG. 8A, the peak current I_UP and the valley current I_DN are measured as 1.102 A and 0.898 A, respectively. According to the formula $$\Delta I\_L = \frac{(VIN - VOUT)}{L1} \times D \times T_S,$$

the current difference ΔI_L is 204 mA. Then, according to another formula S_SV=ΔI_L×R_SEN, the practical sensing voltage S_SV is 40.8 mV. Lastly, according to another formula C_SEN×S_SV=ΔI_S×D, a simulation sensing capacitance C_SEN is 0.5 uF, and a model of a simulation sensing current source ΔI_S=204 mA 80 is setup as well.

Figure 8B:
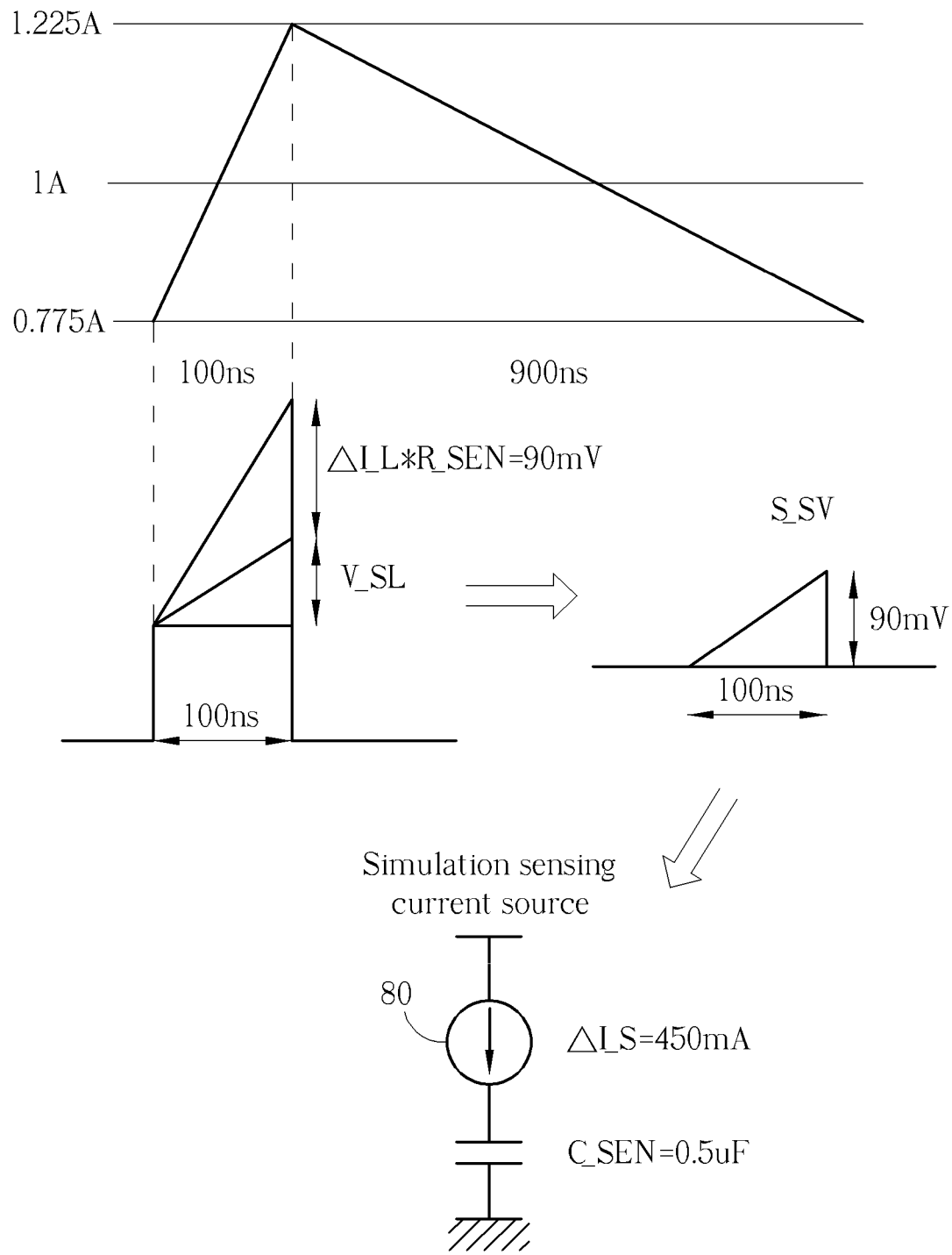
FIG. 8B illustrates a schematic diagram of another practical measurement of the current sensing module according to an embodiment of the invention.

Please refer to FIG. 8B, which illustrates a schematic diagram of another practical measurement of the current sensing module 208 according to an embodiment of the invention. In comparison with FIG. 8A, the embodiment shown in FIG. 8B changes value of the inductor as 1 uH, which leads to the measurement of the peak current I_UP as well as the valley current I_DN to be 1.225 A and 0.775 A, respectively. Similarly, the formula $$\Delta I\_L = \frac{(VIN - VOUT)}{L1} \times D \times T_S$$

is utilized to obtain the current difference ΔI_L to be 450 mA. Then, the formula S_SV=ΔI_L×R_SEN is utilized to obtain the practical sensing voltage S_SV to be 90 mV. Lastly, the simulation sensing capacitance C_SEN of 0.5 uF and ΔI_S=450 mA shown in FIG. 8B and the formula C_SEN× S_SV=ΔI_S×D are utilized to obtain the sensing voltage S_SV to be 90 mV. In other words, the current sensing module 208 as well as the simulation sensing current source 80 in the embodiment of the invention are not affected by the capacitance changes of the output terminal, and the current sensing module 208 still transmits the sensing voltage SSV to the pulse width modulation comparator 214.

Figure 8C:
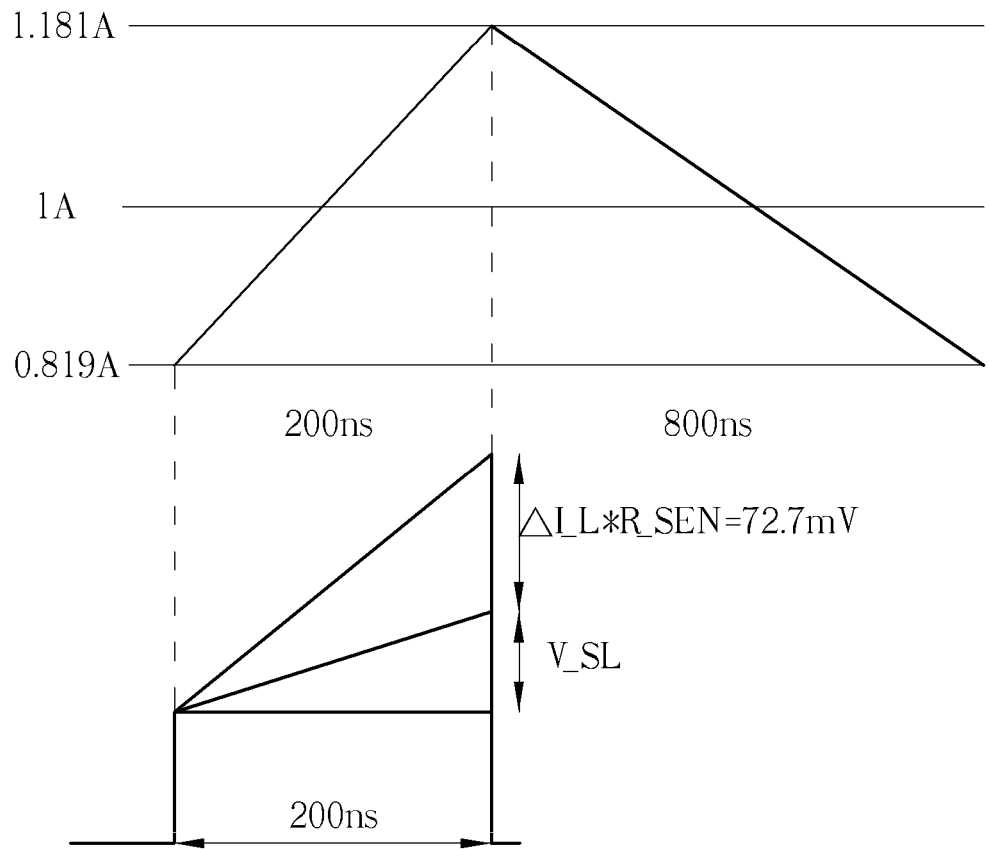
FIG. 8C illustrates a schematic diagram of another practical measurement of the current sensing module according to an embodiment of the invention.

Please refer to FIG. 8C, which illustrates a schematic diagram of another practical measurement of the current sensing module 208 according to an embodiment of the invention. In comparison with FIG. 8A, the embodiment shown in FIG. 8C changes the output voltage to be 1.0V and the 20% duty cycle signal D (i.e. the conduction periods of the up-bridge circuit and the down-bridge circuit are 200 ns and 800 ns, respectively). Besides, the peak current I_UP and the valley current I_DN are 1.181 A and 0.819 A, respectively. Similarly, the formula $$\Delta I\_L = \frac{(VIN - VOUT)}{L1} \times D \times T_S$$

is utilized to obtain the current different ΔI_L to be 363 mA. Then, the formula S_SV=ΔI_L×R_SEN is utilized to obtain the practical sensing voltage S_SV to be 72.7 mV. Lastly, the simulation sensing capacitance C_SEN of 0.5 uF shown in FIG. 8A and the formula C_SEN×S_SV=ΔI_S×D are utilized to obtain the sensing voltage S_SV to be 145.2 mV. However, the real sensing voltage should be 72.7 mV, which is only half of the value 145.2 mV $$\left(\text{i.e. } \frac{145.2 \text{ mV}}{72.6 \text{ mV}} = \frac{20\%}{10\%}\right).$$

When the periodic period S_Duty changes, the current difference ΔI_S is required to be adjusted to the adjustment current difference ΔI_AS. Then, the formula C_SEN×S_SV=ΔI_AS×D is utilized to obtain the sensing voltage S_SV to be 72.7 mV, such as the embodiment shown in FIG. 4. In other words, the current sensing module 208 as well as the simulation sensing current source 80 in the embodiment of the invention are not affected by changes of the larger output voltage corresponding to the incremental duty cycle signal D, and the current sensing module 208 still transmits the sensing voltage SSV to the pulse width modulation comparator 214.

Figure 8D:
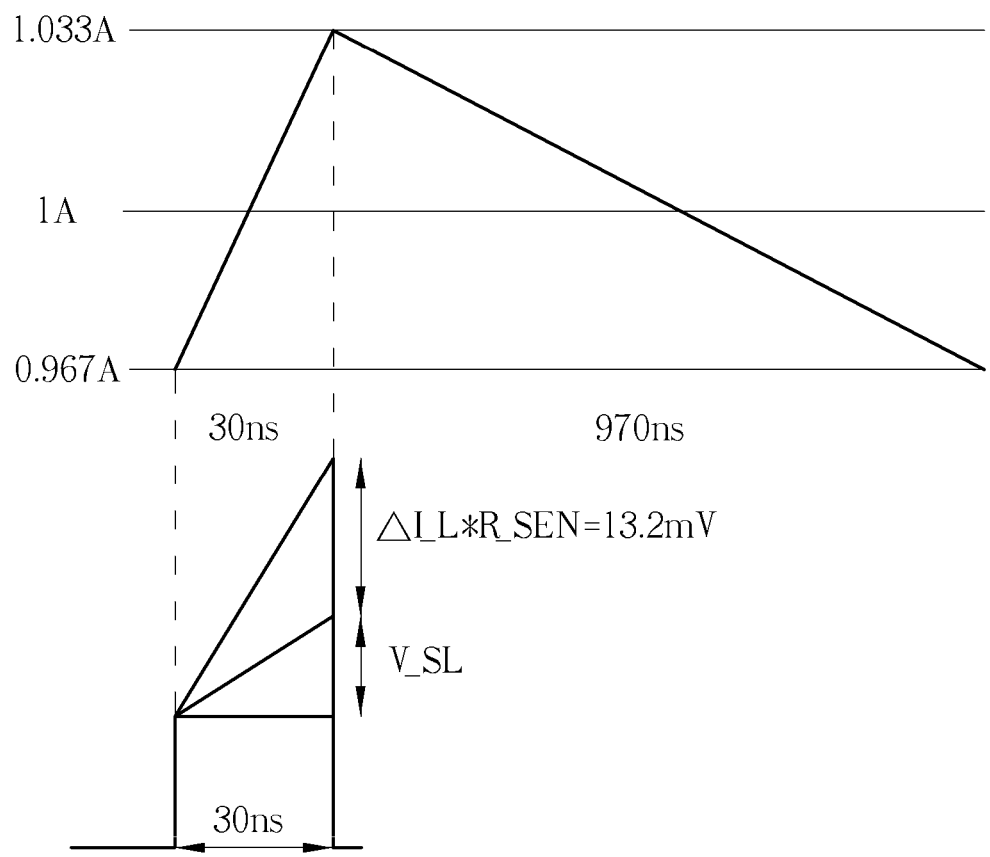
FIG. 8D illustrates a schematic diagram of another practical measurement of the current sensing module according to an embodiment of the invention.

Please refer to FIG. 8D, which illustrates a schematic diagram of another practical measurement of the current sensing module 208 according to an embodiment of the invention. In comparison with FIG. 8A, the embodiment shown in FIG. 8D changes the output voltage to be 0.15V and the 3% duty cycle signal D (i.e. the conduction periods of the up-bridge circuit and the down-bridge circuit are 30 ns and 970 ns, respectively). The peak current I_UP and the valley current I_DN are 1.033 A and 0.967 A, respectively. Similarly, the formula $$\Delta I\_L = \frac{(VIN - VOUT)}{L1} \times D \times T_S$$

is utilized to obtain the current different ΔI_L to be 66 mA. Then, the formula S_SV=ΔI_L×R_SEN is utilized to obtain the practical sensing voltage S_SV to be 13.2 mV. Lastly, the simulation sensing capacitance C_SEN of 0.5 uF shown in FIG. 8A and the formula C_SEN×S_SV=ΔI_S×D are utilized to obtain the sensing voltage S_SV to be 3.96 mV. According to the formula $$\frac{3.96 \text{ mV}}{13.2 \text{ mV}} = \frac{3\%}{10\%}$$

and the formula C_SEN×S_SV=ΔI_AS×D, the sensing voltage should be 13.2 mV. In other words, the current sensing module 208 as well as the simulation sensing current source 80 in the embodiment of the invention are not affected by changes of the smaller output voltage corresponding to the decreasing duty cycle signal D, and the current sensing module 208 still transmits the sensing voltage SSV to the pulse width modulation comparator 214.

Noticeably, the sensing voltage SSV outputted by the current sensing module 208 of the invention is not affected by changes of the inductance value or the voltage value of the output terminal. In comparison with the prior art, the product application of the voltage converter apparatus 20 has broadened to provide accurate sensing voltage S_SV.

Figure 9:
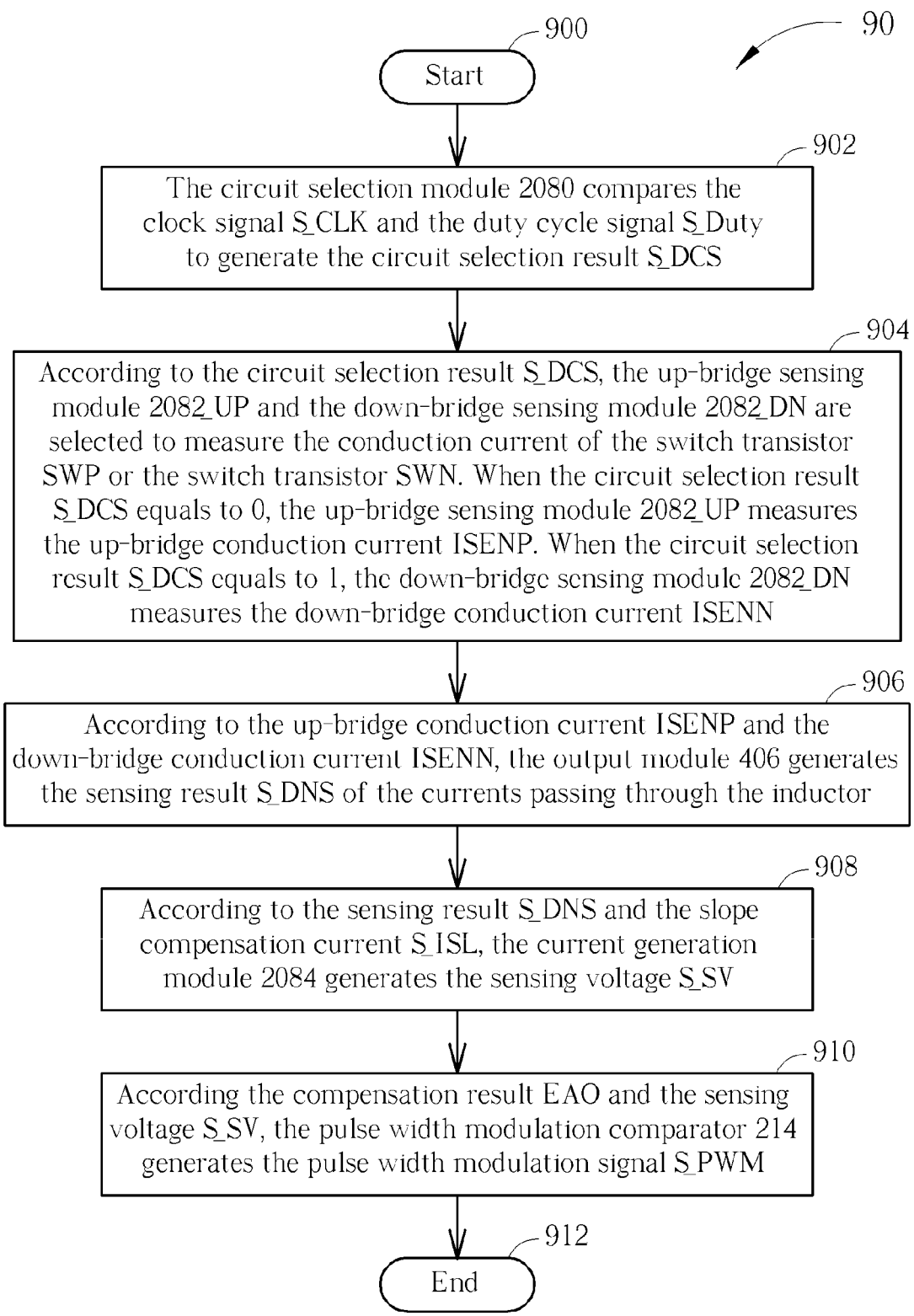
FIG. 9 illustrates a flow chart of a current sensing process according to an embodiment of the invention.

In the embodiment of the invention, the current sensing module 208 of the voltage converter apparatus 20 measuring the conduction currents of the switch transistor SWP or SWN to correspondingly output the pulse width modulation signal S_PWM can be summarized as a current sensing process 90, as shown in FIG. 9. The current sensing process 90 includes the steps as follows:

Step 900: Start.

Step 902: The circuit selection module 2080 compares the clock signal SCLK and the duty cycle signal S_Duty to generate the circuit selection result S_DCS.

Step 904: According to the circuit selection result SDCS, the up-bridge sensing module 2082_UP and the down-bridge sensing module 2082_DN are selected to measure the conduction current of the switch transistor SWP or the switch transistor SWN. When the circuit selection result S_DCS equals to 0, the up-bridge sensing module 2082_UP measures the up-bridge conduction current ISENP. When the circuit selection result S_DCS equals to 1, the down-bridge sensing module 2082_DN measures the down-bridge conduction current ISENN.

Step 906: According to the up-bridge conduction current ISENP and the down-bridge conduction current ISENN, the output module 406 generates the sensing result S_DNS of the currents passing through the inductor.

Step 908: According to the sensing result SDNS and the slope compensation current SISL, the current generation module 2084 generates the sensing voltage SSV.

Step 910: According the compensation result EAO and the sensing voltage S_SV, the pulse width modulation comparator 214 generates the pulse width modulation signal S_PWM.

Step 912: End.

Figure 10:
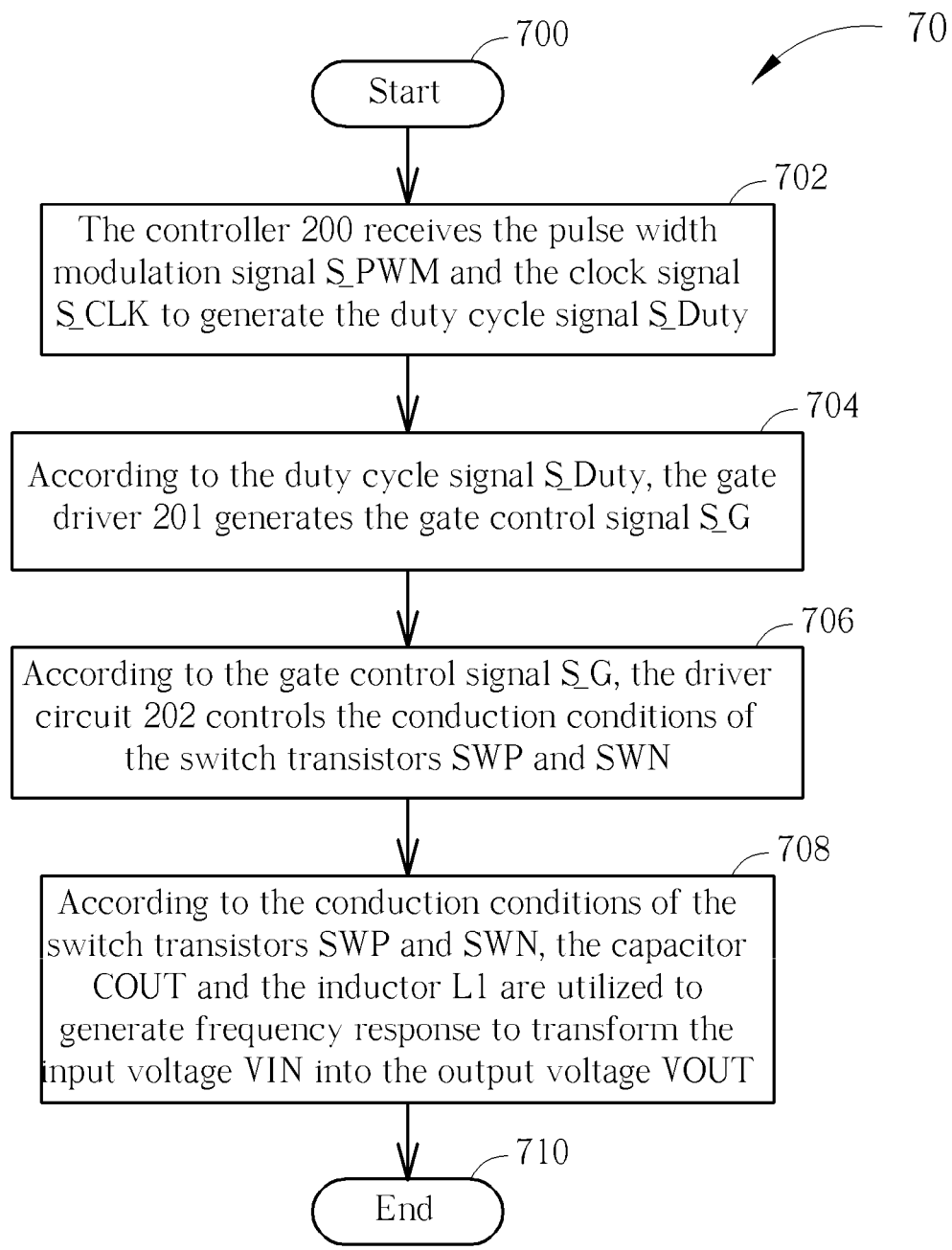
FIG. 10 illustrates a flow chart of a voltage transformation process according to an embodiment of the invention.

In the embodiment of the invention, the process of the voltage converter apparatus 20 transforming the input voltage VIN into the output voltage VOUT can be summarized as a voltage transformation process 70, as shown in FIG. 10. The voltage transformation process 70 includes the steps as follows:

Step 700: Start.

Step 702: The controller 200 receives the pulse width modulation signal SPWM and the clock signal SCLK to generate the duty cycle signal S_Duty.

Step 704: According to the duty cycle signal S_Duty, the gate driver 201 generates the gate control signal S_G.

Step 706: According to the gate control signal S_G, the driver circuit 202 controls the conduction conditions of the switch transistors SWP and SWN.

Step 708: According to the conduction conditions of the switch transistors SWP and SWN, the capacitor COUT and the inductor L1 are utilized to generate frequency response to transform the input voltage VIN into the output voltage VOUT.

Step 710: End.

The detailed steps of the current sensing process 90 and the voltage transformation process 70 can be understood via the related paragraphs of voltage converter apparatus 20, the current sensing module 208 and FIG. 2 to FIG. 8D, and are not described hereinafter. Noticeably, the current sensing module 208 of the invention compares the duty cycle signal S_Duty and the clock signal SCLK to correspondingly select the up-bridge sensing module 2082_UP or the down-bridge sensing module 2082_DN, so as to measure the up-bridge conduction current ISENP of the switch transistor SWP or the down-bridge conduction current ISENN of the switch transistor SWN. Thus, those skilled in the art can combine other voltage measurement modules based on the conception of the invention to simultaneously measure the voltage changes of the switch transistors SWP, SWN to be transformed into the changes of the current, which is also in the scope of the invention. Besides, the embodiment of the invention mainly focuses on the conduction period of the switch transistor SWP being too short, and accordingly, the down-bridge conduction current ISENN of the switch transistor SWN can be measured and copied to reconstruct the sensing voltage S_SV. Once the switch transistor SWN has the same problem that the conduction period is too short or both the switch transistors SWP, SWN are operated at particular duty cycle signals and unable to obtain the related conduction currents, the similar conception can be utilized to process the current measurement/copies for achievement of the same purpose of the invention.

In summary, the invention provides a current sensing module for a voltage converter apparatus. A circuit selection module is utilized to determine a current sensing module for correspondingly measuring an up-bridge conduction current or a down-bridge conduction current. Then, according to a slope compensation current and the up-bridge/down-bridge conduction current, a current generation module generates a sensing voltage to adjust a duty cycle signal of the voltage converter apparatus, so as to improve the voltage transformation efficiency of the voltage converter apparatus and to adaptively measure the conduction currents of the voltage converter apparatus. Also, the current sensing module sets up a simulation sensing current source to be automatically adjusted according to changes of the input/output terminal voltage value or the inductance of the inductor, so as to avoid unexpected changes of the input/output terminal voltage value or the inductances to limiting product application of the voltage converter apparatus Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A current sensing apparatus for a voltage converter apparatus comprising:
    a circuit selection module coupled to a clock generator of the voltage converter apparatus and a controller for generating a circuit selection result according to a clock signal generated by the clock generator and a duty cycle signal generated by the controller;
    a current sensing module coupled to the circuit selection module, an up-bridge circuit and a down-bridge circuit for measuring an up-bridge conduction current at a first terminal point of the up-bridge circuit or a down-bridge conduction current at a second terminal point of the down-bridge circuit according to the circuit selection result; and
    a current generation module coupled to the current sensing module and a slope compensation circuit of the voltage converter apparatus for generating a sensing voltage according to a slope compensation current generated by the slope compensation circuit and the up-bridge conduction current or the down-bridge conduction current, so as to adjust the duty cycle signal of the controller;
    wherein the current sensing apparatus utilizes the duty cycle signal to drive the voltage converter apparatus, the first terminal point is disposed at a pin of the up-bridge circuit coupled to an input voltage and the second terminal point is disposed at a pin of the down-bridge circuit coupled to a ground.

2. The current sensing apparatus of claim 1, wherein the circuit selection module further comprises a comparator for generating the circuit selection result according to a difference between the clock signal and the duty cycle signal.

3. The current sensing apparatus of claim 2, wherein a conduction period of the up-bridge circuit is smaller than a conduction period of the down-bridge circuit when the circuit selection module generates the circuit selection result.

4. The current sensing apparatus of claim 1, wherein the current sensing module further comprises an up-bridge sensing module and a down-bridge sensing module for measuring the up-bridge conduction current and the down-bridge conduction current according to the circuit selection result, so as to generate a conduction current difference.

5. The current sensing apparatus of claim 4, wherein the current sensing module further comprises:
    a clock transformation module comprising:
        a switch module coupled to the clock generator for determining a conduction condition of the switch module according to the clock signal, so as to output a current clock signal; and
        a filter coupled to the switch module for generating an analogy duty cycle signal according to the current clock signal;
    a multiplier coupled to the filter and the current sensing module for generating an adjustment current difference according to a difference between the analogy duty cycle signal and the conduction current difference;
    a transformation module coupled to the multiplier for generating an adjustment voltage difference according to the adjustment current difference;
    a voltage-current transformer coupled to the transformation module for generating a sensing current difference according to the adjustment voltage difference; and
    an output module coupled to the voltage-current transformer for generating a sensing result according to the sensing current difference, the up-bridge conduction current and the down-bridge conduction current.

6. The current sensing apparatus of claim 5, wherein the transformation module further comprises a sensing capacitor and a switch element for generating the adjustment voltage difference according to the adjustment current difference and a reverse phase duty cycle signal related to the duty cycle signal.

7. The current sensing apparatus of claim 5, wherein the current generation module further comprises:
    an adder coupled to the output module for generating a sensing current according to the sensing result and the slope compensation current; and
    a transformation resistor coupled to the adder and a pulse width modulation comparator for transforming the sensing current into the sensing voltage;
    wherein the sensing result is the sensing current difference and the down-bridge conduction current.

8. The current sensing apparatus of claim 5, wherein the current generation module further comprises:
    a transformation resistor coupled to the output module and the slope compensation circuit for generating the sensing voltage according to the up-bridge conduction current and the slope compensation current;
    wherein the sensing result is the up-bridge conduction current.

9. A voltage converter apparatus comprising:
    an input terminal for receiving an input voltage;
    an output terminal for outputting an output voltage;

a clock generator for generating a clock signal;
a controller coupled to the clock generator for receiving the clock signal to generate an duty cycle signal;
an inverter coupled to the controller for receiving the duty cycle signal to generate a reverse phase duty cycle signal;
a gate driver coupled to the inverter for receiving the reverse phase duty cycle signal to generate a gate control signal;
a driver circuit comprising an up-bridge circuit and a down-bridge circuit for receiving the gate control signal to control conduction conditions of the up-bridge circuit and the down-bridge circuit;
an inductor comprising one end coupled to the driver circuit and another end coupled to the output terminal;
a feedback module coupled to the output terminal for generating a feedback signal according to the output voltage;
an error amplifier coupled to the feedback module for generating an amplification signal according to the feedback signal and a reference voltage;
a loop compensation network coupled to the error amplifier for generating a compensation result according to the amplification signal;
a slope compensation circuit for generating a slope compensation current;
a current sensing module comprising:
 a circuit selection module coupled to the clock generator and the controller for generating a circuit selection result according to the clock signal and the duty cycle signal;
 a current sensing module coupled to the circuit selection module, the up-bridge circuit and the down-bridge circuit for measuring an up-bridge conduction current at a first terminal point of the up-bridge circuit or a down-bridge conduction current at a second terminal point of the down-bridge circuit according to the circuit selection result; and
 a current generation module coupled to the current sensing module and the slope compensation circuit for generating a sensing voltage according to the slope compensation current and the up-bridge conduction current or the down-bridge conduction current; and
a pulse width modulation comparator coupled to the current generation module and the loop compensation network for generating a pulse width modulation signal to the controller according to the sensing voltage and the compensation result;
wherein the first terminal point is disposed at a pin of the up-bridge circuit coupled to the input voltage and the second terminal point is disposed at a pin of the down-bridge circuit coupled to a ground.

10. The voltage converter apparatus of claim 9, wherein the circuit selection module further comprises a comparator for generating the circuit selection result according to a difference between the clock signal and the duty cycle signal.

11. The voltage converter apparatus of claim 10, wherein a conduction period of the up-bridge circuit is smaller than a conduction period of the down-bridge circuit when the circuit selection module generates the circuit selection result.

12. The voltage converter apparatus of claim 9, wherein the current sensing module further comprises an up-bridge sensing module and a down-bridge sensing module for measuring the up-bridge conduction current and the down-bridge conduction current according to the circuit selection result, so as to generate a conduction current difference.

13. The voltage converter apparatus of claim 12, wherein the current sensing module further comprises:
a clock transformation module comprising:
 a switch module coupled to the clock generator for determining a conduction condition of the switch module according to the clock signal, so as to output a current clock signal; and
 a filter coupled to the switch module for generating a analogy duty cycle signal according to the current clock signal;
a multiplier coupled to the filter and the current sensing module for generating an adjustment current difference according to a difference between the analogy duty cycle signal and the conduction current difference;
a transformation module coupled to the multiplier for generating an adjustment voltage difference according to the adjustment current difference;
a voltage-current transformer coupled to the transformation module for generating a sensing current difference according to the adjustment voltage difference; and
an output module coupled to the voltage-current transformer for generating a sensing result according to the sensing current difference, the up-bridge conduction current and the down-bridge conduction current.

14. The voltage converter apparatus of claim 13, wherein the transformation module further comprises a sensing capacitor and a switch element for generating the adjustment voltage difference according to the adjustment current difference and the reverse phase duty cycle signal.

15. The voltage converter apparatus of claim 13, wherein the current generation module further comprises:
an adder coupled to the output module for generating a sensing current according to the sensing result and the slope compensation current; and
a transformation resistor coupled to the adder and a pulse width modulation comparator for transforming the sensing current into the sensing voltage;
wherein the sensing result is the sensing current difference and the down-bridge conduction current.

16. The voltage converter apparatus of claim 13, wherein the current generation module further comprises:
a transformation resistor coupled to the output module and the slope compensation circuit for generating the sensing voltage according to the up-bridge conduction current and the slope compensation current;
wherein the sensing result is the up-bridge conduction current.

17. The voltage converter apparatus of claim 9, wherein the feedback module further comprises:
a first resistor comprising one end coupled to the output terminal; and
a second resistor comprising one end coupled to the first resistor and another end coupled to a ground;
wherein the first resistor and the second resistor form a resistance ratio, and the feedback module generates the feedback signal according to the resistance ratio and the output voltage.

18. The voltage converter apparatus of claim 9, further comprising an output capacitor coupled to the output terminal to stabilize the output voltage.

* * * * *